W. J. & L. F. DAUNER.
FEEDING MECHANISM FOR CORN SHELLERS.
APPLICATION FILED AUG. 8, 1910.
974,476.
Patented Nov. 1, 1910.
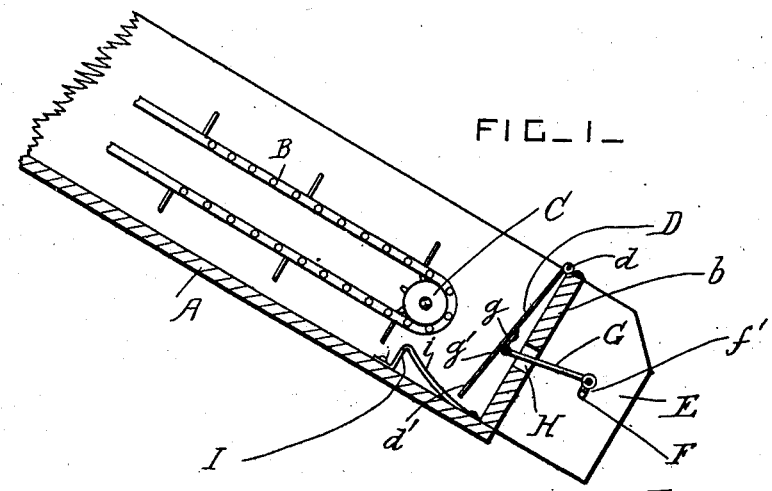
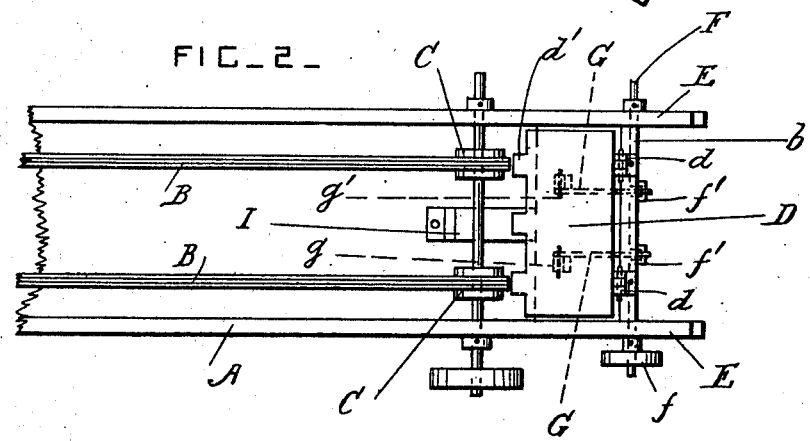

UNITED STATES PATENT OFFICE.

WILLIAM J. DAUNER AND LOUIS F. DAUNER, OF SUTTON, NEBRASKA.

FEEDING MECHANISM FOR CORN-SHELLERS.

974,476.

Specification of Letters Patent. Patented Nov. 1, 1910.

Application filed August 8, 1910. Serial No. 576,237.

*To all whom it may concern:*

Be it known that we, WILLIAM J. DAUNER and LOUIS F. DAUNER, residing at Sutton, in the county of Clay and State of Nebraska, have invented certain new and useful Improvements in Feeding Mechanism for Corn-Shellers; and we do hereby declare the following to be a full, clear, and exact description of the invention, such as will enable others skilled in the art to which it appertains to make and use the same.

This invention relates to the feeding mechanism of corn shellers; and it consists in the novel construction and combination of the parts hereinafter fully described and claimed, whereby the ears of corn are prevented from jamming in the lower part of the feed elevator and whereby solid accumulations of corn or of rubbish are prevented from forming in the lower part of the elevator trough.

In the drawings, Figure 1 is a longitudinal section through a portion of a feed elevator or conveyer provided with an attachment according to this invention. Fig. 2 is a plan view of the same.

A is the lower end portion of the trough of an elevator or feeder, provided with endless conveyer chains B which work over two similar wheels C at the opposite end portions of the trough.

Two conveyer chains are shown, arranged side by side, but any desired number of chains may be used, the trough being made of a suitable width to accommodate the chains, and the chains being provided with suitable projections or other similar devices for engaging with the ears of corn and feeding them to the shelling mechanism.

The ears of corn are thrown into the lower part of the trough, and they frequently become jammed therein and have to be loosened up, and solid accumulations of corn and of rubbish are apt to form at the lower end of the elevator trough. In order to obviate this difficulty, a plate of thin sheet metal D is pivoted to the end piece $b$ of the conveyer trough by hinges $d$ arranged at the upper edges of the plate D, and the lower edge of the plate D is provided with a series of projections $d'$.

The sides of the trough A are continued beyond its end piece $b$ to form bearings E, or bearings are secured to the lower end portion of the trough in any other approved manner.

F is a crankshaft which is journaled in the bearings E and provided with a driving wheel $f$ for revolving it continuously from any convenient part of the corn sheller. The crankshaft is provided with cranks $f'$, and G are connecting-rods driven by the cranks $f'$ and pivoted to lugs $g$ on the plate D by means of pins $g'$.

H are holes in the end piece $b$ for the connecting-rods to project through.

I is a metallic guard strap secured to the bottom of the conveyer trough between the two conveyer chains. When more than two conveyer chains are provided, a similar guard strap is arranged between each two adjacent chains. Each guard strap has a curved portion $i$ arranged opposite one of the projections on the plate D, and this curved portion is substantially concentric with the hinges of the plate. The guard strap prevents anything which may slide down the trough between the chains from striking against the plate D.

The plate D is oscillated continuously by means of the crank-shaft, and it prevents the ears of corn from jamming in the lower end portion of the trough and also prevents the formation of solid accumulations. The use of a plurality of cranks and connecting-rods permits a plate of thin sheet metal to be used without being distorted by contact with the corn.

What we claim is:

1. In feeding mechanism for a corn sheller, the combination, with a trough, and a conveyer working therein; of a pivoted plate arranged crosswise in the trough at the receiving end of the conveyer, and driving mechanism operating to oscillate the said plate independent of the motion of the conveyer.

2. In feeding mechanism for a corn sheller, the combination, with a trough, and an endless conveyer working therein; of a plate hinged to the receiving end of the said trough, a crank-shaft journaled beyond the end of the trough, and a connecting-rod which oscillates the said plate from the said crank-shaft.

3. In feeding mechanism for a corn sheller, the combination, with a trough and two endless conveyers working side by side in the trough; of a guard strap secured to the bottom of the trough between the said conveyers, a plate hinged to the receiving end of the said trough above the said strap, and driving devices for oscillating the said plate.

4. In feeding mechanism for a corn sheller, the combination, with a trough, and endless conveying mechanism working therein; of a plate of thin sheet metal having its upper edge hinged to the receiving end of the trough, a crankshaft provided with a plurality of cranks and journaled beyond the end of the trough, and connecting-rods engaging with the said cranks and pivoted to the said plate at different points of its width.

In testimony whereof we affix our signatures, in presence of two witnesses.

WILLIAM J. DAUNER.
LOUIS F. DAUNER.

Witnesses:
JNO. G. GRIESS,
A. E. STAETER.